(12) United States Patent
Gan et al.

(10) Patent No.: US 12,526,700 B2
(45) Date of Patent: Jan. 13, 2026

(54) METHODS, ENTITIES AND COMPUTER READABLE MEDIUM FOR EMERGENCY HANDLING

(71) Applicant: Telefonaktiebolaget LM Ericsson (publ), Stockholm (SE)

(72) Inventors: Juying Gan, Shanghai (CN); Peter Hedman, Helsingborg (SE); Yunjie Lu, Shanghai (CN); George Foti, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 581 days.

(21) Appl. No.: 17/790,715

(22) PCT Filed: Dec. 15, 2020

(86) PCT No.: PCT/EP2020/086119
§ 371 (c)(1),
(2) Date: Jul. 1, 2022

(87) PCT Pub. No.: WO2021/136650
PCT Pub. Date: Jul. 8, 2021

(65) Prior Publication Data
US 2023/0041303 A1 Feb. 9, 2023

(30) Foreign Application Priority Data
Jan. 2, 2020 (WO) ................ PCT/CN2020/070129

(51) Int. Cl.
*H04W 36/00* (2009.01)
*H04W 76/50* (2018.01)
(52) U.S. Cl.
CPC ....... *H04W 36/0033* (2013.01); *H04W 76/50* (2018.02); *H04W 36/0022* (2013.01)

(58) Field of Classification Search
CPC ............ H04W 36/0033; H04W 76/50; H04W 36/0022
See application file for complete search history.

(56) References Cited

U.S. PATENT DOCUMENTS

| 9,906,887 B2 | 2/2018 | Vrbaski et al. |
| 2012/0189016 A1* | 7/2012 | Bakker ................ H04W 76/11 370/401 |

(Continued)

FOREIGN PATENT DOCUMENTS

| KR | 10-2010-0048385 A | 5/2010 |
| WO | 2019/120694 A1 | 6/2019 |
| WO | 2019/223660 A1 | 11/2019 |

OTHER PUBLICATIONS

International Search Report and Written Opinion dated Apr. 6, 2021 in International Application No. PCT/EP2020/086119 (11 pages).

(Continued)

*Primary Examiner* — Ajay Cattungal
(74) *Attorney, Agent, or Firm* — Rothwell, Figg, Ernst & Manbeck, P.C.

(57) ABSTRACT

The present disclosure concerns managing mobility and emergency handling by receiving a mobility message from a second entity for managing access and mobility, wherein the mobility message carries a data network identifier for an IP connectivity; determining that the data network identifier in the received mobility message is an emergency data network identifier, based on emergency data network identifiers contained in emergency configuration data with which the first entity for managing access and mobility is configured; and determining that the IP connectivity is established for an emergency service.

21 Claims, 8 Drawing Sheets

(56) References Cited

U.S. PATENT DOCUMENTS

| | | | |
|---|---|---|---|
| 2013/0094405 A1 | 4/2013 | Vrbaski et al. | |
| 2019/0053010 A1* | 2/2019 | Edge | H04W 4/029 |
| 2019/0110182 A1* | 4/2019 | Liu | H04W 4/06 |
| 2019/0182718 A1* | 6/2019 | Shan | H04W 76/16 |
| 2019/0253842 A1 | 8/2019 | Rao | |
| 2019/0297121 A1 | 9/2019 | Qiao et al. | |
| 2019/0306251 A1 | 10/2019 | Talebi Fard et al. | |
| 2019/0313468 A1 | 10/2019 | Talebi Fard et al. | |
| 2020/0252785 A1* | 8/2020 | Wu | H04W 28/06 |
| 2021/0021981 A1* | 1/2021 | Lauster | H04L 45/021 |
| 2021/0058886 A1* | 2/2021 | Youn | H04W 76/27 |
| 2021/0219122 A1* | 7/2021 | Buckley | H04L 67/303 |
| 2021/0377721 A1* | 12/2021 | Zhou | H04W 8/065 |
| 2023/0041303 A1 | 2/2023 | Gan et al. | |

OTHER PUBLICATIONS

International Preliminary Report on Patentability with Transmittal dated Nov. 23, 2021 in International Application No. PCT/EP2020/086119 (15 pages).

3GPP TS 23.502 V16.3.0, 3rd Generation Partnership Project; Technical Specification Group Services and System Aspects; Procedures for the 5G System (5GS); Stage 2 (Release 16), Dec. 19, 2019, Sophia Antipolis Valbonne, France (558 pages).

3GPP TS 23.501 V16.2.0, 3rd Generation Partnership Project; Technical Specification Group Services and System Aspects; System Architecture for the 5G System (5GS); Stage 2 (Release 16), Sep. 2019, Sophia Antipolis Valbonne, France (391 pages).

3GPP TS 23.401 V16.4.0, 3rd Generation Partnership Project; Technical Specification Group Services and System Aspects; General Packet Radio Service (GPRS) enhancements for Evolved Universal Terrestrial Radio Access Network (E-UTRAN) access (Release 16), Sep. 2019, Sophia Antipolis Valbonne, France (424 pages).

3GPP TS 23.502 V16.2.0, 3rd Generation Partnership Project; Technical Specification Group Services and System Aspects; Procedures for the 5G System (5GS); Stage 2 (Release 16), Sep. 2019, Sophia Antipolis Valbonne, France (525 pages).

3GPP TS 23.502 V16.6.0, 3rd Generation Partnership Project; Technical Specification Group Services and System Aspects; Procedures for the 5G System (5GS); Stage 2 (Release 16), Sep. 2020, Sophia Antipolis Valbonne, France (597 pages).

English Translation of the Search Report from Colombian Office Action for a related Colombian Patent Application No. NC2022/0010532 issued on Aug. 1, 2025 (3 pages).

Superintendency of Industry and Commerce, Republic of Columbia, Ref. File No. NC2017/0007984 (Aug. 2019) (20 pages).

\* cited by examiner

METHODS, ENTITIES AND COMPUTER READABLE MEDIUM FOR EMERGENCY HANDLING

CROSS REFERENCE TO RELATED APPLICATION(S)

This application is a 35 U.S.C. § 371 National Stage of International Patent Application No. PCT/EP2020/086119, filed Dec. 15, 2020, which claims priority to International Patent Application No. PCT/CN2020/070129, filed Jan. 2, 2020. The above identified applications are incorporated by this reference.

TECHNICAL FIELD

The present disclosure generally relates to the technical field of communication technologies, and particularly to methods, entities and computer readable medium for emergency handling.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

The emergency service can be provided in different ways as follows:

Scenario-1: User Equipment (UE) normally attached/registered, emergency PDN/PDU Session is established An emergency attached or Restricted Local Operator Service (RLOS) attached UE shall not initiate any Packet Data Network (PDN) Connectivity Request procedure. A normal attached UE shall request a PDN connection for emergency services when Emergency Service is required and an emergency PDN connection is not already active (Section 5.10.2 of 3GPP TS 23.401 v16.5.0. In the present disclosure, 3GPP TS 23.401 v16.5.0 is incorporated herein by reference in its entirety, which be retrieved from may http://www.3gpp.org/ftp//Specs/archive/23_series/23.401/23401-g50.zip).

Scenario-2: UE emergency attached/registered
　Scenario-2a: UE is authenticated but in limited service state;
　Scenario-2b: UE is unauthenticated (i.e. UE with Subscriber Identity Modula (SIM) but unauthenticated, or UE is SIM-less)
　　Only UEs that are authenticated are allowed. These UEs must have a valid IMSI. These UEs are authenticated and may be in limited service state due to being in a location that they are restricted from service. A UE that cannot be authenticated will be rejected.
　　All UEs are allowed. Along with authenticated UEs, this includes UEs with an International Mobile Subscriber Identity (IMSI) that cannot be authenticated and UEs with only an IMEI. If an unauthenticated IMSI is provided by the UE, the unauthenticated IMSI is retained in the network for recording purposes. The IMEI is used in the network to identify the UE (Section 4.3.12 of 3GPP TS 23.401 v16.5.0).

For Scenario-1 and Scenario-2a, the new/target entity for managing access and mobility (MME) determines the emergency PDN connection based on Allocation and Retention Priority (ARP) values. If all the Evolved Packet System (EPS) bearers of the UE have an emergency ARP value, the new MME may skip the update location procedure or proceed even if the update location fails (Section 5.3.3.1 of 3GPP TS 23.401 v16.5.0).

For Scenario-2b, either an indication "unauthenticated IMSI" is sent from the old MME to the new MME, or IMEI is included but IMSI is not included from the old MME to the new MME (i.e. UE without SIM).

At inter-MME change in EPS, once the new/target MME determines emergency PDN connection by checking the ARP of the EPS bearers (i.e. Scenario-1 and Scenario-2a), The new/target MME may skip the update location procedure or proceed even if the update location fails.

If due to regional subscription restrictions or access restrictions, then the new/target MME accepts the TAU Request and deactivates the non-emergency EPS bearers.

If due to regional subscription restrictions or access restrictions the UE is not allowed to access the TA:
　The MME rejects the Tracking Area Update Request with an appropriate cause to the UE.
　For UEs with emergency EPS bearers, i.e. at least one EPS bearer has an ARP value reserved for emergency services, the new MME accepts the Tracking Area Update Request and deactivates all non-emergency PDN connections. If the Tracking Area Update procedure is initiated in ECM-IDLE state, all non-emergency EPS bearers are deactivated by the Tracking Area Update procedure without bearer deactivation signalling between the UE and the MME (Section 5.3.3.1 of 3GPP TS 23.401 v16.5.0).

The above three scenarios are also applicable for MME to Access Management Function (AMF) change (i.e. EPS to 5GS mobility) or inter-AMF change.

For Scenario-2b, the new AMF (i.e., the target AMF) knows the UE is emergency attached, in the same way as in the new MME at inter-MME change.

For Scenario-1 and Scenario-2a, however, currently it is not clear in the 3GPP specification how the AMF can determine if the UE is emergency attached/registered or any PDU session is for emergency service.

Upon MME to AMF change (i.e., EPS to 5GS mobility) or intra-5GS inter-AMF mobility (i.e., inter-AMF change), since the target AMF may not be aware if the UE is emergency attached/registered, or if any PDN connection or Protocol Data Unit (PDU) Session is used for emergence service, the session continuity for emergency service may not be fulfilled upon the EPS to 5GS mobility or upon intra-5GS inter-AMF mobility in situations as follows:
　if there is regional restriction or access restriction, the new AMF will fail the registration procedure;
　the new AMF will always interact with the Unified Data Management (UDM), and if the UDM interaction fails, the AMF will fail the registration procedure.

SUMMARY

In order to solve or at least alleviate the problems as discussed above, the present disclosure provides technical solutions for emergency handling upon the EPS to 5GS mobility and the intra-5GS inter-AMF mobility as follows.

According to a first aspect of the present disclosure, a method at a first entity for managing access and mobility is provided. The method includes: receiving a mobility message from a second entity for managing access and mobility, wherein the mobility message carries a data network identifier for an IP connectivity; determining that the data network identifier in the received mobility message is an emergency data network identifier, based on emergency data network identifiers contained in emergency configuration data with which the first entity for managing access and mobility is configured; and determining that the IP connectivity is established for an emergency service.

In an exemplary embodiment, the method further includes: generating an emergency indication indicating that the data network identifier in the received mobility message is an emergency data network identifier; and storing the emergency indication.

In an exemplary embodiment, the stored emergency indication is carried in SessionContextList of a User Equipment (UE) Context Information Element (IE) for a subsequent transmission.

In an exemplary embodiment, the first entity for managing access and mobility is an Access Management Function (AMF) entity, and the second entity for managing access and mobility is a Mobility Management Entity (MME), and the IP connectivity is a PDN connection/PDU session.

In an exemplary embodiment, the mobility message includes at least one of: a Forward Relocation Request message, or a Context Response message, and the data network identifier is an Access Point Name (APN) carried by the Forward Relocation Request message and/or the Context Response message in an EPS PDN Connection IE.

In an exemplary embodiment, the first entity for managing access and mobility is a first AMF entity, and the second entity for managing access and mobility is a second AMF entity, and the IP connectivity is a PDU session.

In an exemplary embodiment, the mobility message includes at least one of: an Namf_Communication_UEContextTransfer Response an message, or Namf_Communication_CreateUEContext Request message, and the data network identifier is a DNN carried by the Namf_Communication_UEContextTransfer Response message and/or the Namf_Communication_CreateUEContext Request message in SessionContextList of a UE Context IE.

According to a second aspect of the present disclosure, a method at a first AMF entity is provided. The method includes: receiving a mobility message from a second AMF entity, wherein the mobility message carries an emergency indication indicating that a data network identifier for a PDU session is an emergency data network identifier; and determining that the PDU session is established for an emergency service based on the emergency indication.

In an exemplary embodiment, the method further includes: storing the emergency indication.

In an exemplary embodiment, the stored emergency indication is carried in SessionContextList of a UE Context IE for a subsequent transmission.

In an exemplary embodiment, the data network identifier for the PDU session being an emergency data network identifier is determined by the second AMF entity based on emergency data network identifiers contained in emergency configuration data with which the second AMF entity is configured, or based on a request type "Emergency PDU Session" from a UE for establishing the PDU session.

In an exemplary embodiment, the mobility message includes at least one of: an Namf_Communication_UEContextTransfer Response message, or an Namf_Communication_CreateUEContext Request message, and the emergency indication is carried by the Namf_Communication_UEContextTransfer Response message and/or the Namf_Communication_CreateUEContext Request message in SessionContextList of a UE Context IE.

According to a third aspect of the present disclosure, a method at a second AMF entity is provided. The method includes: determining that a data network identifier for a PDU session to be transferred to a first AMF entity is an emergency data network identifier; generating an emergency indication indicating that the data network identifier is an emergency data network identifier; and transmitting a mobility message carrying the emergency indication to the first AMF entity.

In an exemplary embodiment, the data network identifier for the PDU session is determined to be an emergency data network identifier based on emergency data network identifiers contained in emergency configuration data with which the second AMF entity is configured, or based on a request type "Emergency PDU Session" from a UE for establishing the PDU session.

In an exemplary embodiment, the mobility message includes at least one of: an Namf_Communication_UEContextTransfer Response message, or an Namf_Communication_CreateUEContext Request message, and the emergency indication is carried by the Namf_Communication_UEContextTransfer Response message and/or the Namf_Communication_CreateUEContext Request message in SessionContextList of a UE Context IE.

According to a fourth aspect of the present disclosure, an entity for managing access and mobility is provided. The entity for managing access and mobility includes: at least one processor, and at least one memory, storing instructions which, when executed on the at least one processor, cause the entity for managing access and mobility to perform the method according to the first aspect of the present disclosure.

According to a fifth aspect of the present disclosure, a first AMF entity is provided. The first AMF entity includes: at least one processor, and at least one memory, storing instructions which, when executed on the at least one processor, cause the first AMF entity to perform the method according to the second aspect of the present disclosure.

According to a sixth aspect of the present disclosure, a second AMF entity is provided. The second AMF entity includes: at least one processor, and at least one memory, storing instructions which, when executed on the at least one processor, cause the second AMF entity to perform the method according to the third aspect of the present disclosure.

According to a seventh aspect of the present disclosure, a computer readable storage medium is provided. The computer readable storage medium has computer program instructions stored thereon, the computer program instructions, when executed by at least one processor in an entity for managing access and mobility, causing the entity for managing access and mobility to perform the method according to any of the first, second and third aspects of the present disclosure.

The technical solutions of the present disclosure may achieve at least benefits as follows.

The target AMF (i.e., the first AMF as discussed above) may be aware if the UE is emergency attached/registered, or if the PDN connection or PDU Session is used for emergence service by 1) the target AMF determining, based on emergency data network identifiers contained in emergency configuration data with which the target AMF is configured, if the data network identifier for the PDN connection or PDU Session received from the MME or the source AMF (i.e., the second AMF as discussed above) is an emergency data network identifier, or 2) the new indication from the source AMF that is determined by the source AMF based on emergency data network identifiers contained in emergency configuration data with which the source AMF is configured, or based on a request type "Emergency PDU Session" from the UE for establishing the PDU session, so that the same level of support for emergency service may be achieved at the EPS to 5GS mobility and/or the intra-5GS inter-AMF mobility, i.e., if there is regional restriction or access restriction, the target AMF will not fail the registration procedure;

if interaction from the AMF to the UDM fails, the AMF will not fail the registration procedure.

That is, the session continuity for emergency service in EPS may be fulfilled upon the EPS to 5GS mobility or the intra-5GS inter-AMF mobility.

BRIEF DESCRIPTION OF THE DRAWINGS

The objects, advantages and characteristics of the present disclosure will be more apparent, according to descriptions of preferred embodiments in connection with the drawings, in which.

Figure 1:
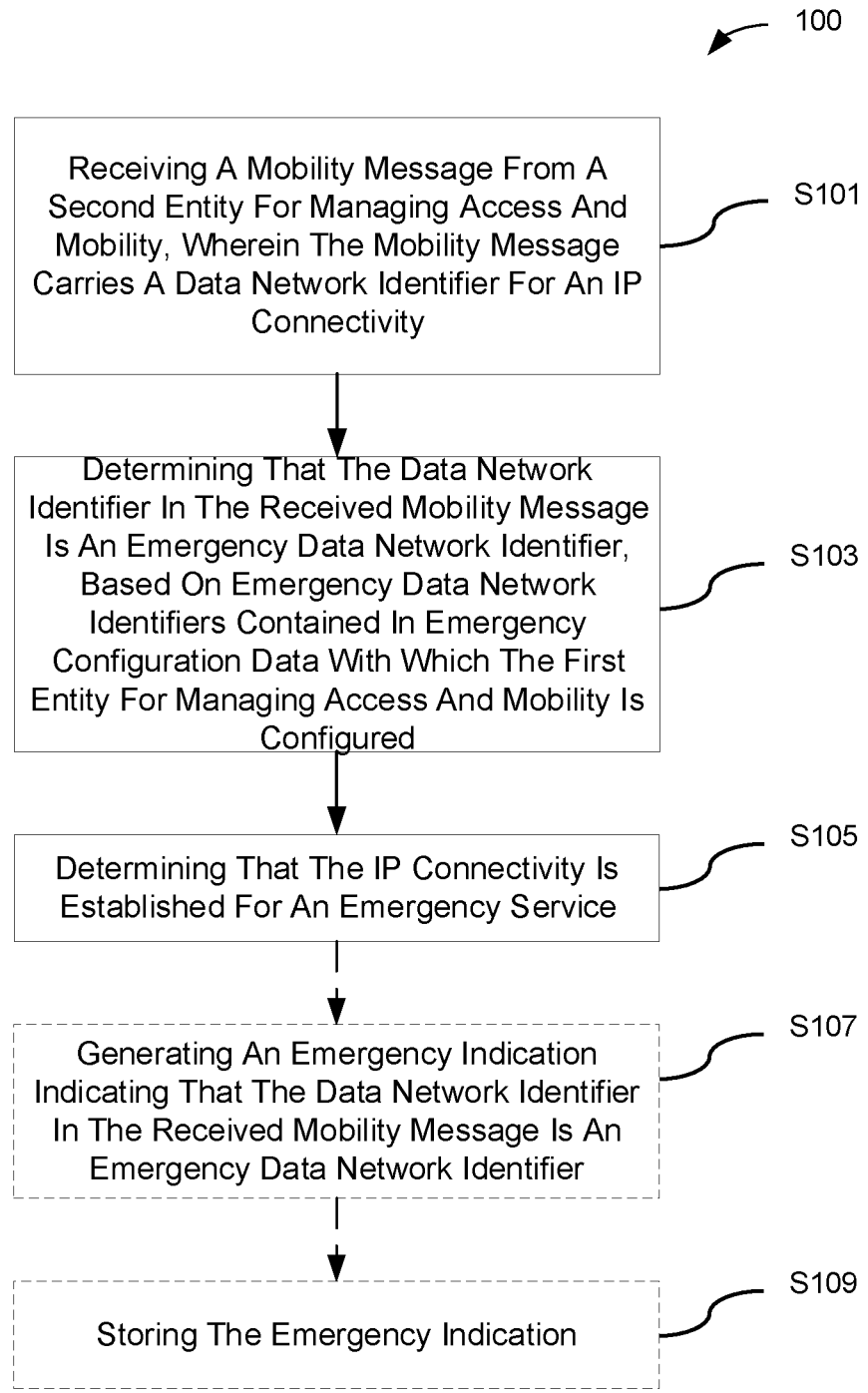
FIG. 1 schematically shows an emergency handling method at a target entity for managing access and mobility according to a first exemplary embodiment of the present disclosure.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

The basic ideas of the present disclosure mainly consist in that

At the EPS to 5GS mobility, the AMF determines whether a data network identifier (such as an APN/DNN) for an IP connectivity (such as a PDN connection/PDU session) in a received mobility message (such as a Forward Relocation Request message and/or a Context Response message, which are Global Packet Radio Service Tunneling Protocol (GTP) messages) is an emergency one; optionally, the AMF may store an emergency indication indicating that the data network identifier in the received mobility message is an emergency one;

At the intra-5GS inter-AMF mobility, i.e., the inter-AMF change, the target AMF determines whether a data network identifier (such as a DNN) for an IP connectivity (such as a PDU session) in a received mobility message (such as an Namf_Communication_UEContextTransfer Response message and/or an Namf_ Communication_CreateUEContext Request message) is an emergency one; optionally, the target AMF may store an emergency indication indicating that the data network identifier in the received mobility message is an emergency one; or the target AMF receives, in a mobility message (such as an Namf_Communication_UEContextTransfer and/or Response message an Namf_Communication_ CreateUEContext Request message) from the source AMF, an emergency indication indicating that a data network identifier (such as a DNN) for a PDU session is an emergency one, the emergency indication being determined by the source AMF based on emergency data network identifiers contained in emergency configuration data with which the source AMF is configured, or based on a request type "Emergency PDU Session" from the UE for establishing the PDU session.

Hereinafter, an emergency handling method 100 at a target entity for managing access and mobility according to a first exemplary embodiment of the present disclosure will be described with reference to FIG. 1. The method 100 may be applied in both the EPS to 5GS mobility procedure and the inter-AMF change procedure.

FIG. 1

As shown in FIG. 1, the method 100 includes steps S101~S105.

In step S101, the target entity for managing access and mobility (such as a target AMF, which is interchangeable with the term "target entity for managing access and mobility" hereinafter) may receive a mobility message (such as a Context Response message for Mobility Registration and/or a Forward Relocation Request message for Handover in the EPS to 5GS mobility procedure, an Namf_Communication_ UEContextTransfer Response message for Mobility Registration and/or an Namf_Communication_CreateUEContext Request message for Handover in the inter-AMF change procedure) from a source entity for managing access and mobility (such as a MME in the EPS to 5GS mobility procedure, a source AMF in the inter-AMF change procedure).

The mobility message carries a data network identifier for an IP connectivity (such as a PDN connection/PDU session in the EPS to 5GS mobility procedure, a PDU session in the inter-AMF change procedure). Here, the data network identifier may be an APN (for EPS)/DNN (for 5GS). It should be understood that "APN" is an expression used in EPS, which is represented by the expression "DNN" in 5GS. The DNN in 5GS is equivalent to the APN in EPS (Section 9A of 3GPP TS 23.003 v15.8.0, which is incorporated herein by reference in its entirety). It also should be understood that "PDN connection" is an expression used in EPS, which is represented by the expression "PDU session" in 5GS. The PDU session in 5GS is equivalent to the PDN connection in EPS. The APN for the PDN connection used in EPS is expressed as the DNN for the PDU session in 5GS.

In an exemplary embodiment for the EPS to 5GS mobility procedure, an APN for a PDN connection is carried by the Context Response message and/or the Forward Relocation Request message, particularly in an EPS PDN Connection IE.

In an exemplary embodiment for the inter-AMF change procedure, a DNN for a PDU session is carried by the Namf_Communication_UEContextTransfer Response message and/or the Namf_Communication_CreateUEContext Request message, particularly in SessionContextList of a UE Context IE.

Then in step S103, the target entity for managing access and mobility may determine that the data network identifier in the received mobility message is an emergency data network identifier, based on emergency data network identifiers contained in emergency configuration data with which the target entity for managing access and mobility is configured, which will be described in detail below.

According to 3GPP TS 23.501 v16.3.0, which is incorporated herein by reference in its entirety, an emergency DNN is configured in Emergency Configuration Data in the AMF. As specified in Section 5.16.4 of 3GPP TS 23.501 v16.3.0, in order to provide Emergency Services, the AMF is configured with Emergency Configuration Data that are applied to Emergency Services that are established by an AMF based on request from the UE. The AMF Emergency Configuration Data contains Emergency DNN which is used to derive a Session Management Function (SMF). In addition, the AMF Emergency Configuration Data may contain the statically configured SMF for the Emergency DNN. The SMF may also store Emergency Configuration Data that contains statically configured User Plane Function (UPF) information for the Emergency DNN.

In a particular example, the target AMF, in either the EPS to 5GS mobility procedure or the inter-AMF change procedure, may determine whether the data network identifier (such as the DNN for 5GS) in the received mobility message is an emergency one based on Emergency DNNs that have been contained in the Emergency Configuration Data with which the target AMF is configured.

For example, the target AMF may compare the DNN in the received mobility message with the Emergency DNNs that have been contained in the Emergency Configuration Data with which the target AMF is configured. If the DNN in the received mobility message matches with one of the Emergency DNNs, the target AMF determines that the DNN in the received mobility message is an emergency one.

Then in step S105, the target AMF may determine that the IP connectivity is established for an emergency service, based on the determination result of the data network identifier in the received mobility message being an emergency one.

In an exemplary embodiment, the method 100 may further include steps S107 and S109.

In step S107, the target AMF may generate an emergency indication indicating that the data network identifier in the received mobility message is an emergency data network identifier.

Then in step S109, the target AMF may store the emergency indication. The stored emergency indication may be carried in SessionContextList of a UE Context IE for the subsequent transmission.

Figure 2:
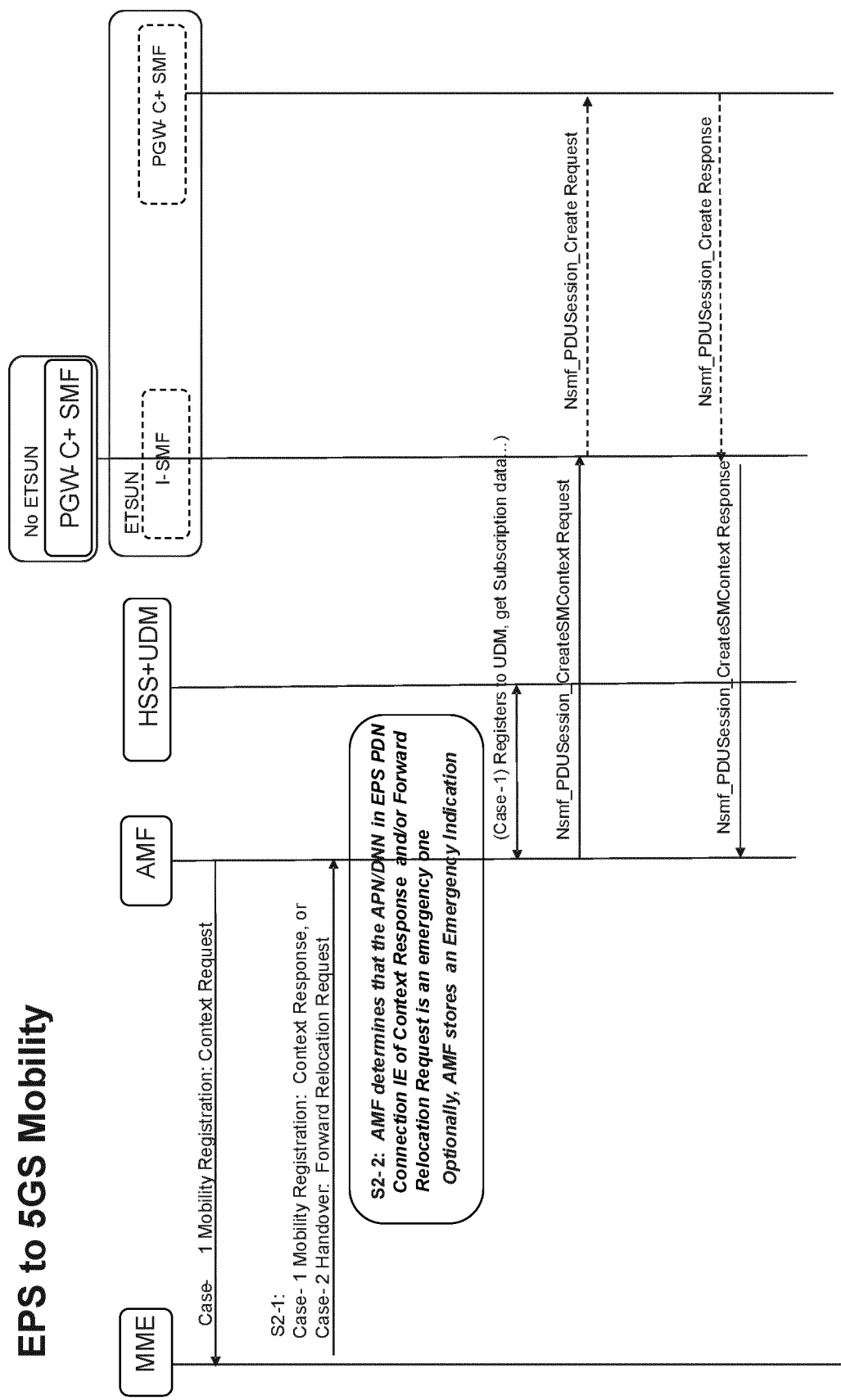
FIG. 2 schematically shows a signaling sequence diagram of an EPS to 5GS mobility procedure to which the emergency handling method according to the first embodiment of the present disclosure is applied.
Figure 3:
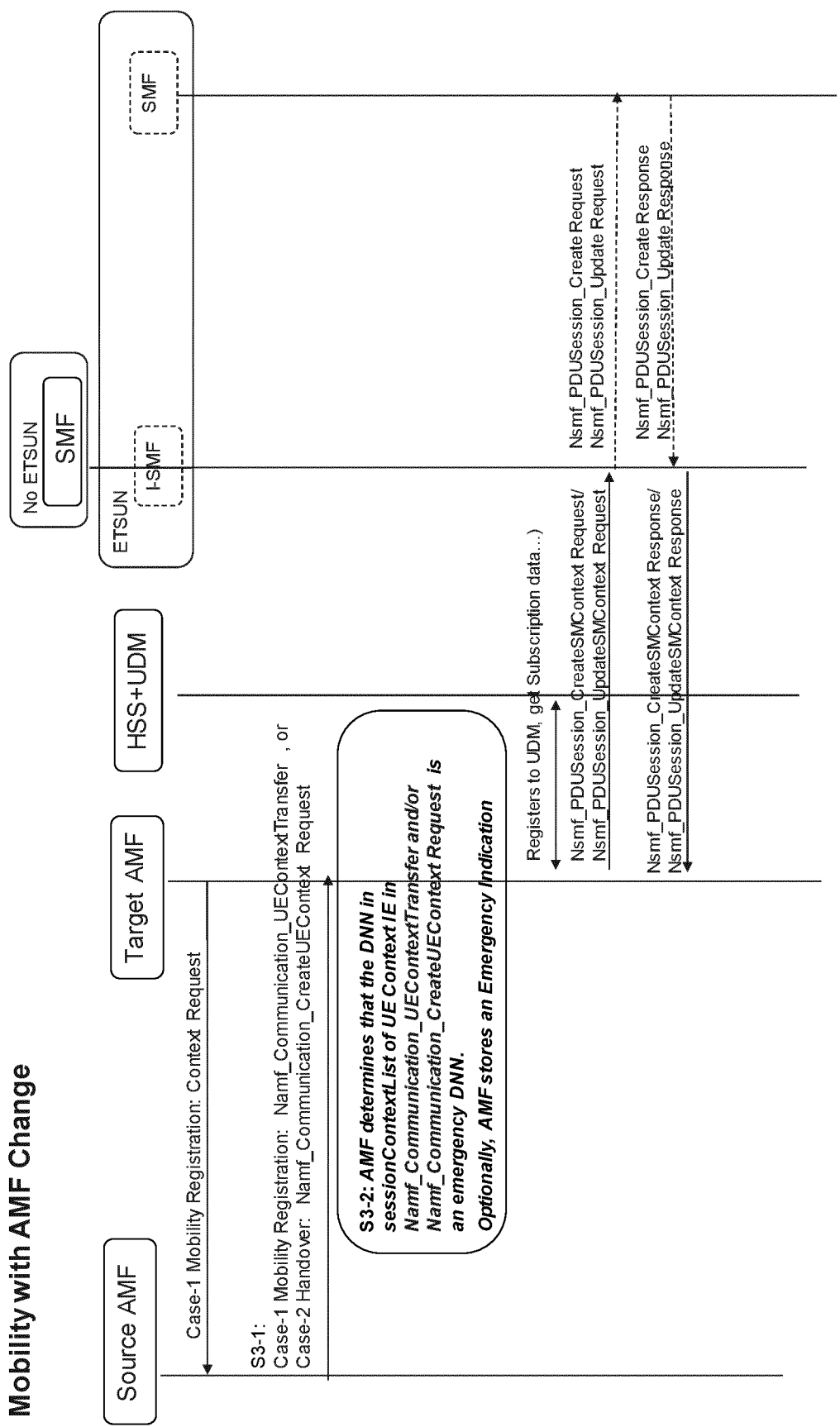
FIG. 3 schematically shows a signaling sequence diagram of an inter-AMF change procedure to which the emergency handling method according to the first embodiment of the present disclosure is applied.

Hereinafter, the method 100 for emergency handling will be described in detail in conjunction with signaling sequence diagrams of the EPS to 5GS mobility procedure and the inter-AMF change procedure as shown in FIGS. 2 and 3 respectively. In connection with the signaling sequence diagrams of FIGS. 2 and 3, the method 100 as previously described will be understood better.

FIG. 2

FIG. 2 schematically shows the signaling sequence diagram of the EPS to 5GS mobility procedure to which the method 100 is applied. It should be noted that the description below only focuses on signaling related to the method 100, and other signaling is omitted to avoid obscuring the principle of the present disclosure. In FIG. 2, modification on the signaling related to the method 100 is shown in Bold Italics.

In the EPS to 5GS mobility procedure as shown in FIG. 2, the source entity for managing access and mobility is an MME, and the target entity for managing access and mobility is an AMF.

As shown in FIG. 2, in Signaling S2-1, the MME transmits, to the AMF, a Context Response message (for Mobility Registration) and/or a Forward Relocation Request message (for Handover), wherein an APN for a PDN connection (the expression for EPS) is carried by the Context Response message and/or the Forward Relocation Request message in e.g., an EPS PDN Connection IE.

Accordingly, the AMF receives the Context Response message and/or the Forward Relocation Request message that carries the APN for the PDN connection in the EPS PDN Connection IE. For the AMF in 5GS, the APN for the PDN connection is expressed as the DNN for the PDU session.

In Signaling S2-2, the AMF determines whether the received DNN for the PDU session is an emergency one, based on Emergency DNNs that have been contained in the Emergency Configuration Data with which the AMF is configured.

For example, the AMF may compare the received DNN with the Emergency DNNs that have been contained in the Emergency Configuration Data with which the AMF is configured. If the received DNN matches with one of the Emergency DNNs, the AMF determines that the received DNN is an emergency one.

Thus, the AMF may determine that the PDU session is established for an emergency service, based on the determination result of the received DNN for the PDU session being an emergency one.

Optionally, the AMF may generate an emergency indication indicating that the received DNN is an emergency one, and store the emergency indication. The stored emergency indication may be carried in SessionContextList of a UE Context IE for the subsequent transmission.

FIG. 3

FIG. 3 schematically shows the signaling sequence diagram of the inter-AMF change procedure to which the method 100 is applied. It should be noted that the description below only focuses on signaling related to the method 100, and other signaling is omitted to avoid obscuring the principle of the present disclosure. In FIG. 3, modification on the signaling related to the method 100 is shown in Bold Italics.

In the inter-AMF change procedure as shown in FIG. 3, the source entity for managing access and mobility is an AMF (called a source AMF), and the target entity for managing access and mobility is an AMF (called a target AMF).

As shown in FIG. 3, in Signaling S3-1, the source AMF transmits, to the target AMF, a Namf_Communication_UEContextTransfer Response message (for Mobility Registration) and/or a Namf_Communication_CreateUEContext Request message (for Handover), wherein a DNN for a PDU session is carried by the Namf_Communication_UEContextTransfer Response message and/or the Namf_Communication_CreateUEContext Request message in e.g., SessionContextList of a UE Context IE.

Accordingly, the target AMF receives the Namf_Communication_UEContextTransfer Response message and/or the Namf_Communication_CreateUEContext Request message that carries the DNN for the PDU session in SessionContextList of the UE Context IE.

In Signaling S3-2, the target AMF determines whether the DNN for the PDU session in the received Namf_Communication_UEContextTransfer Response message and/or Namf_Communication_CreateUEContext Request message is an emergency one, based on Emergency DNNs that have been contained in the Emergency Configuration Data with which the target AMF is configured.

For example, the target AMF may compare the DNN in the received Namf_Communication_UEContextTransfer Response message and/or Namf_Communication_CreateUEContext Request message with the Emergency DNNs that have been contained in the Emergency Configuration Data with which the target AMF is configured. If the DNN in the received Namf_Communication_UEContextTransfer Response message and/or Namf_Communication_CreateUEContext Request message matches with one of the Emergency DNNs, the target AMF determines that the DNN in the received Namf_Communication_UEContextTransfer Response message and/or Namf_Communication_CreateUEContext Request message is an emergency one.

Thus, the target AMF may determine that the PDU session is established for an emergency service, based on the determination result of the DNN for the PDU session in the received Namf_Communication_UEContextTransfer Response message and/or Namf_Communication_CreateUEContext Request message being an emergency one.

Optionally, the target AMF may generate an emergency indication indicating that the DNN in the received Namf_Communication_UEContextTransfer Response message and/or Namf_Communication_CreateUEContext Request message is an emergency one, and store the emergency indication. The stored emergency indication may be carried in SessionContextList of a UE Context IE for the subsequent transmission.

As previously described, in the inter-AMF mobility procedure, the target AMF may determine that a DNN for a PDU session is an emergency one by receiving a corresponding emergency indication from the source AMF, which will be presented in a second embodiment of the present disclosure.

Hereinafter, a method 400 at a target AMF for emergency handling according to the second exemplary embodiment of the present disclosure will be described with reference to FIG. 4. The method 400 is applied in the inter-AMF change procedure.

FIG. 4

Figure 4:
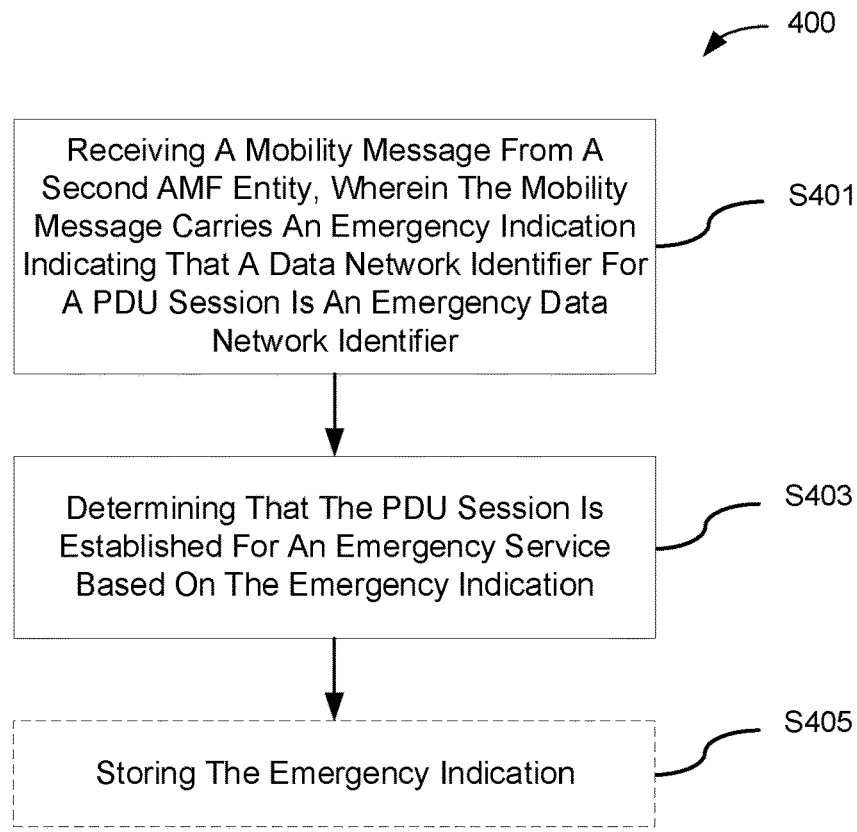
FIG. 4 schematically shows an emergency handling method at a target AMF according to a second exemplary embodiment of the present disclosure.

As shown in FIG. 4, the method 400 includes steps S401 and S403.

In step S401, the target AMF may receive a mobility message (such as an Namf_Communication_UEContextTransfer Response message for Mobility Registration, an Namf_Communication_CreateUEContext Request message for Handover) from the source AMF. The mobility message carries an emergency indication indicating that a data network identifier (such as a DNN) for a PDU session is an emergency one, e.g., in SessionContextList of a UE Context IE.

As will be described later in conjunction with FIG. 5, the data network identifier for the PDU session being an emergency data network identifier may be determined by the source AMF entity based on emergency data network identifiers (such as Emergency DNNs as described previously) contained in emergency configuration data with which the source AMF is configured, or based on a request type "Emergency PDU Session" from the UE for establishing the PDU session.

In step S403, the target AMF may determine that the PDU session is established for an emergency service based on the emergency indication.

In an exemplary embodiment, the method 400 may further include steps S405.

In step S405, the target AMF may store the emergency indication. The stored emergency indication may be carried in SessionContextList of the UE Context IE for the subsequent transmission.

Accordingly, a method 500 at a source AMF for emergency handling according to the second exemplary embodiment of the present disclosure will be described with reference to FIG. 5. The method 500 is also applied in the inter-AMF change procedure.

FIG. 5

Figure 5:
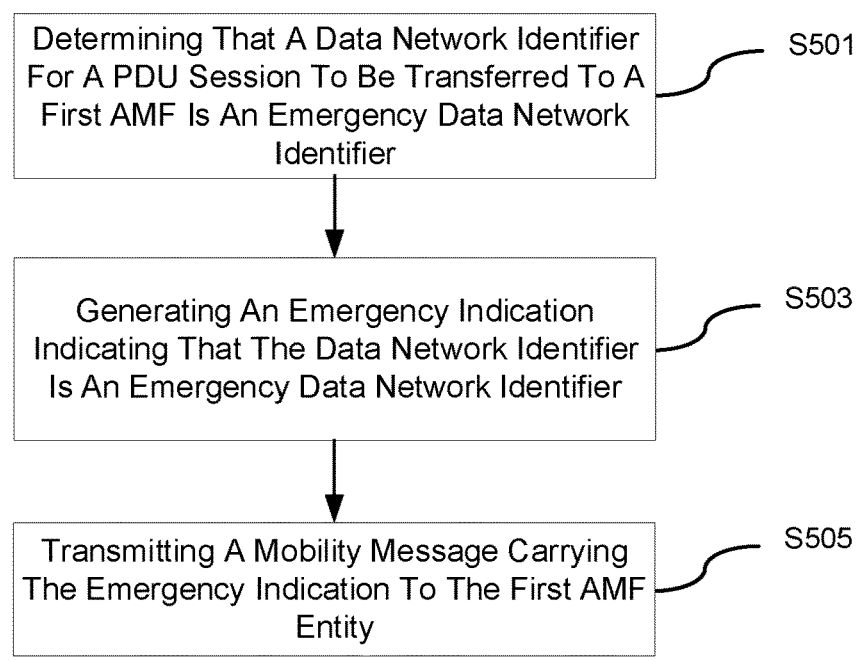
FIG. 5 schematically shows an emergency handling method at a source AMF according to the second exemplary embodiment of the present disclosure.

As shown in FIG. 5, the method 500 includes steps S501~S505.

In step S501, the source AMF may determine that a data network identifier (such as a DNN) for a PDU session to be transferred to the target AMF (for either Mobility Registration or Handover) is an emergency data network identifier.

In particular, the source AMF may determine that the data network identifier (such as the DNN) for the PDU session is an emergency data network identifier based on emergency data network identifiers contained in emergency configuration data with which the source AMF entity is configured, or based on a request type "Emergency PDU Session" from the UE for establishing the PDU session.

In a particular example, the source AMF may determine whether the DNN for the PDU session is an emergency one based on Emergency DNNs that have been contained in the Emergency Configuration Data with which the source AMF is configured.

For example, the source AMF may compare the DNN for the PDU session with the Emergency DNNs that have been contained in the Emergency Configuration Data with which the source AMF is configured. If the DNN for the PDU session matches with one of the Emergency DNNs, the source AMF determines that the DNN for the PDU session is an emergency one.

Then in step S503, the source AMF may generate an emergency indication indicating that the data network identifier is an emergency data network identifier.

In step S505, the source AMF may transmit a mobility message carrying the emergency indication to a target AMF. The mobility message may be an Namf_Communication_UEContextTransfer Response message (for Mobility Registration) and/or an Namf_Communication_CreateUEContext Request message (for Handover). In particular, the source AMF may carry the emergency indication by the Namf_Communication_UEContextTransfer Response message and/or the Namf_Communication_CreateUEContext Request message in SessionContextList of a UE Context IE.

Figure 6:
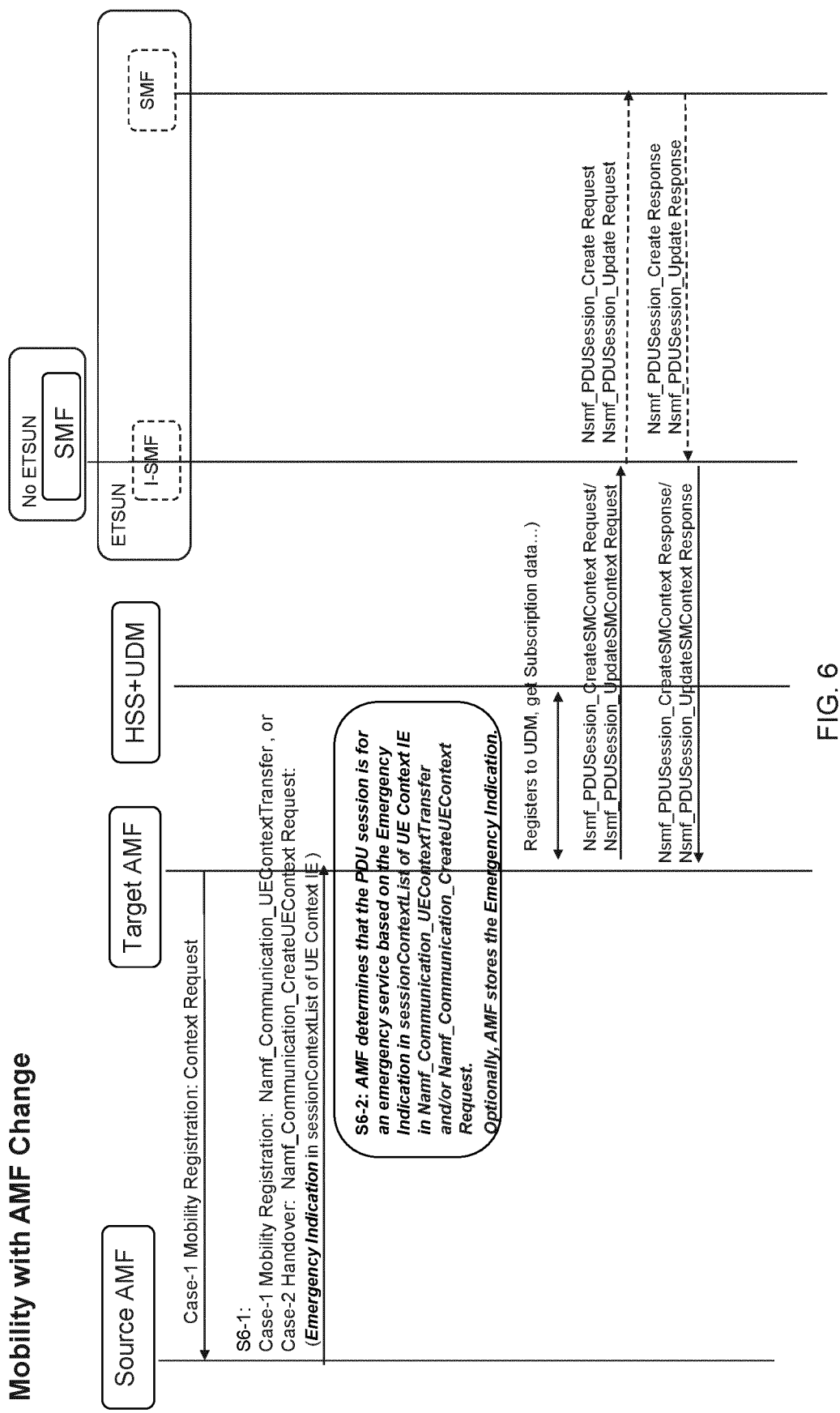
FIG. 6 schematically shows a signaling sequence diagram of an inter-AMF change procedure to which the emergency handling methods at the target AMF and the source AMF according to the second embodiment of the present disclosure are applied.

Hereinafter, the methods 400 and 500 for emergency handling will be described in detail in conjunction with signaling sequence diagrams of the inter-AMF change procedure as shown in FIG. 6. In connection with the signaling sequence diagrams of FIG. 6, the methods 400 and 500 as previously described will be understood better.

FIG. 6

FIG. 6 schematically shows the signaling sequence diagram of the inter-AMF change procedure to which the methods 400 and 500 are applied. It should be noted that the description below only focuses on signaling related to the methods 400 and 500, and other signaling is omitted to avoid obscuring the principle of the present disclosure. In FIG. 6, modification on the signaling related to the method methods 400 and 500 is shown in Bold Italics.

In Signaling S6-1, the source AMF may determine that a DNN for a PDU session to be transferred to the target AMF is an emergency data network identifier.

In particular, the source AMF may determine that the DNN for the PDU session is an emergency data network identifier based on Emergency DNNs contained in Emergency Configuration Data with which the source AMF entity is configured, or based on a request type "Emergency PDU Session" from the UE for establishing the PDU session.

For example, the source AMF may compare the DNN for the PDU session with the Emergency DNNs that have been contained in the Emergency Configuration Data with which the source AMF is configured. If the DNN for the PDU session matches with one of the Emergency DNNs, the source AMF determines that the DNN for the PDU session is an emergency one.

Then, the source AMF may generate an emergency indication indicating that the DNN is an emergency DNN.

Next, the source AMF may transmit, to the target AMF, an Namf_Communication_UEContextTransfer Response message (for Mobility Registration) and/or an Namf_Communication_CreateUEContext Request message (for Handover) that carry the emergency indication in SessionContextList of a UE Context IE.

Accordingly, the target AMF may the receive Namf_Communication_UEContextTransfer Response message (for Mobility Registration) and/or Namf_Communication_CreateUEContext Request message (for Handover) from the source AMF that carry the emergency indication in SessionContextList of a UE Context IE.

In Signaling S6-2, the target AMF may determine that the PDU session is established for an emergency service based on the emergency indication.

Optionally, the target AMF may store the emergency indication. The stored emergency indication may be carried in SessionContextList of the UE Context IE for the subsequent transmission.

Figure 7:
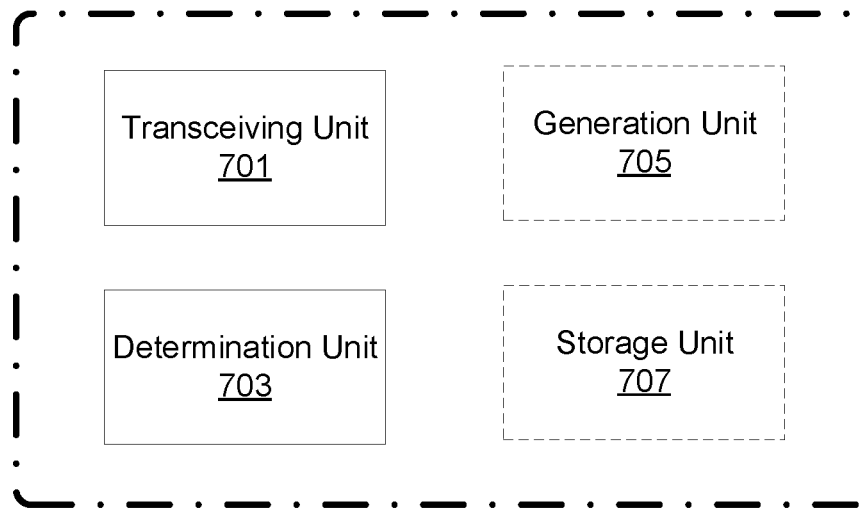
FIG. 7 schematically shows a block diagram of a target entity for managing access and mobility according to an exemplary embodiment of the present disclosure.

Hereinafter, a structure of a target entity for managing access and mobility according to an exemplary embodiment of the present disclosure will be described with reference to FIG. 7. FIG. 7 schematically shows a block diagram of a target entity for managing access and mobility 700 according to an exemplary embodiment of the present disclosure. The target entity for managing access and mobility 700 in FIG. 7 may perform the method 100 as described previously with reference to FIG. 1. Accordingly, some detailed description on the target entity for managing access and mobility 700 may refer to the corresponding description of the method 100 in FIG. 1 and the signaling sequence diagrams of FIGS. 2 and 3 as previously discussed, and thus will be omitted here for simplicity.

FIG. 7

As shown in FIG. 7, the target entity for managing access and mobility 700 includes a transceiving unit 701 and a determination unit 703. It should be understood that the target entity for managing access and mobility 700 may be a target AMF in either the EPS to 5GS mobility procedure or the inter-AMF change procedure.

The transceiving unit 701 may receive a mobility message (such as a Context Response message for Mobility Registration and/or a Forward Relocation Request message for Handover in the EPS to 5GS mobility procedure, an Namf_Communication_UEContextTransfer Response message for Mobility Registration and/or an Namf_Communication_CreateUEContext Request message for Handover in the inter-AMF change procedure) from a source entity for managing access and mobility (such as a MME in the EPS to 5GS mobility procedure, a source AMF in the inter-AMF change procedure).

The mobility message carries a data network identifier for an IP connectivity (such as a PDN connection/PDU session in the EPS to 5GS mobility procedure, a PDU session in the inter-AMF change procedure). Here, the data network identifier may be an APN (for EPS)/DNN (for 5GS). The APN for the PDN connection used in EPS is expressed as the DNN for the PDU session in 5GS.

In an exemplary embodiment for the EPS to 5GS mobility procedure, an APN for a PDN connection is carried by the Context Response message and/or the Forward Relocation Request message, particularly in an EPS PDN Connection IE.

In an exemplary embodiment for the inter-AMF change procedure, a DNN for a PDU session is carried by the Namf_Communication_UEContextTransfer Response message and/or the Namf_Communication_CreateUEContext Request message, particularly in SessionContextList of a UE Context IE.

Then, the determination unit 703 may determine that the data network identifier in the received mobility message is an emergency data network identifier, based on emergency data network identifiers contained in emergency configuration data with which the target entity for managing access and mobility 700 is configured.

Thus, the determination unit 703 may further determine that the IP connectivity is established for an emergency service, based on the determination result of the data network identifier in the received mobility message being an emergency one.

In an exemplary embodiment, the target entity for managing access and mobility 700 may further include a generation unit 705 and a storage unit 707.

The generation unit 705 may generate an emergency indication indicating that the data network identifier in the received mobility message is an emergency data network identifier.

Then, the storage unit 707 may store the emergency indication. The stored emergency indication may be carried in SessionContextList of a UE Context IE for the subsequent transmission.

Figure 8:
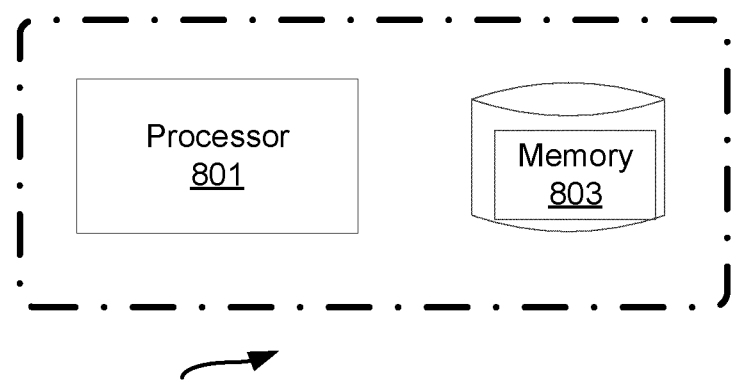
FIG. 8 schematically shows a block diagram of a target entity for managing access and mobility according to another exemplary embodiment of the present disclosure.

Hereinafter, a structure of a target entity for managing access and mobility according to another exemplary embodiment of the present disclosure will be described with reference to FIG. 8. FIG. 8 schematically shows a block diagram of a entity for managing access and mobility 800 according to another exemplary embodiment of the present disclosure. The entity for managing access and mobility 800 in FIG. 8 may perform the method 100 as described previously with reference to FIG. 1. Accordingly, some detailed description on the target entity for managing access and mobility 700 may refer to the corresponding description of the method 100 in FIG. 1 and the signaling sequence diagrams of FIGS. 2 and 3 as previously discussed, and thus will be omitted here for simplicity.

FIG. 8

As shown in FIG. 8, the target entity for managing access and mobility 800 includes at least one processor 801 and at least one memory 803. The at least one processor 801 includes e.g., any suitable CPU (Central Processing Unit), microcontroller, DSP (Digital Signal Processor), etc., capable of executing computer program instructions. The at least one memory 803 may be any combination of a RAM (Random Access Memory) and a ROM (Read Only Memory). The at least one processor memory 803 may also include persistent storage, which, for example, can be any single one or combination of magnetic memory, optical memory, or solid state memory or even remotely mounted memory.

The at least one memory 803 stores instructions executable by the at least one processor 801, whereby the target entity for managing access and mobility 800 is operative to perform the actions, e.g., of the procedures as described earlier respectively in conjunction with FIG. 1.

In particular, the instructions, when loaded from the at least one memory 803 and executed on the at least one processor 801, may cause the target entity for managing access and mobility 800 to receive a mobility message (such as a Context Response message for Mobility Registration and/or a Forward Relocation Request message for Handover in the EPS to 5GS mobility procedure, an Namf_Communication_UEContextTransfer Response message for Mobility Registration and/or an Namf_Communication_CreateUEContext Request message for Handover in the inter-AMF change procedure) from a source entity for managing access and mobility (such as a MME in the EPS to 5GS mobility procedure, a source AMF in the inter-AMF change procedure).

The mobility message carries a data network identifier for an IP connectivity (such as a PDN connection/PDU session in the EPS to 5GS mobility procedure, a PDU session in the inter-AMF change procedure). Here, the data network identifier may be an APN (for EPS)/DNN (for 5GS). The APN for the PDN connection used in EPS is expressed as the DNN for the PDU session in 5GS.

In an exemplary embodiment for the EPS to 5GS mobility procedure, an APN for a PDN connection is carried by the Context Response message and/or the Forward Relocation Request message, particularly in an EPS PDN Connection IE.

In an exemplary embodiment for the inter-AMF change procedure, a DNN for a PDU session is carried by the Namf_Communication_UEContextTransfer Response message and/or the Namf_Communication_CreateUEContext Request message, particularly in SessionContextList of a UE Context IE.

The instructions, when loaded from the at least one memory 803 and executed on the at least one processor 801, may further cause the target entity for managing access and mobility 800 to determine that the data network identifier in the received mobility message is an emergency data network identifier, based on emergency data network identifiers contained in emergency configuration data with which the target entity for managing access and mobility is configured.

The instructions, when loaded from the at least one memory 803 and executed on the at least one processor 801, may further cause the target entity for managing access and mobility 800 to determine that the IP connectivity is established for an emergency service, based on the determination result of the data network identifier in the received mobility message being an emergency one.

In an exemplary embodiment, the instructions, when loaded from the at least one memory 803 and executed on the at least one processor 801, may further cause the target entity for managing access and mobility 800 to generate an emergency indication indicating that the data network identifier in the received mobility message is an emergency data network identifier; and store the emergency indication. The stored emergency indication may be carried in SessionContextList of a UE Context IE for the subsequent transmission.

Figure 9:
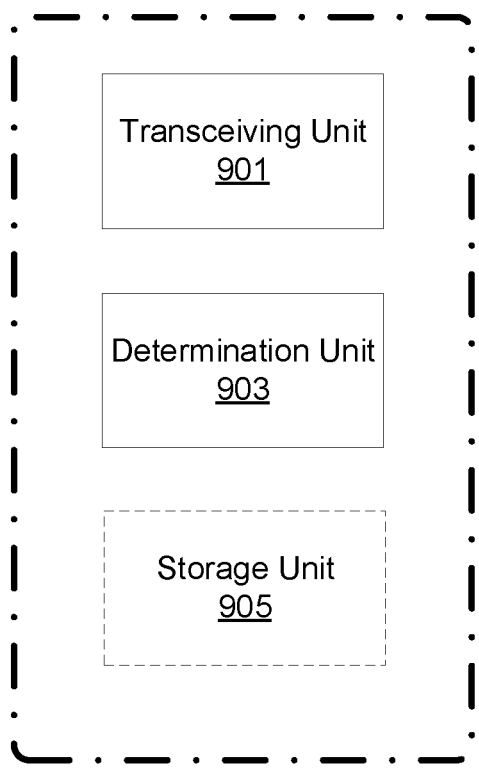
FIG. 9 schematically shows a block diagram of a target AMF according to an exemplary embodiment of the present disclosure.

Hereinafter, a structure of a target AMF according to an exemplary embodiment of the present disclosure will be described with reference to FIG. 9. FIG. 9 schematically shows a block diagram of a target AMF 900 according to an exemplary embodiment of the present disclosure. The target AMF 900 in FIG. 9 may perform the method 400 as described previously with reference to FIG. 4. Accordingly, some detailed description on the target AMF 900 may refer to the corresponding description of the method 400 in FIG. 4 and the signaling sequence diagram of FIG. 6 as previously discussed, and thus will be omitted here for simplicity.

FIG. 9

As shown in FIG. 9, the target AMF 900 includes a transceiving unit 901, a determination unit 903, and a storage unit 905. It should be understood that the target AMF 900 is used in the inter-AMF change procedure.

The transceiving unit 901 may receive a mobility message (such as an Namf_Communication_UEContextTransfer Response message for Mobility Registration, an Namf_Communication_CreateUEContext Request message for Handover) from the source AMF. The mobility message carries an emergency indication indicating that a data network identifier (such as a DNN) for a PDU session is an emergency one, e.g., in SessionContextList of a UE Context IE.

The data network identifier for the PDU session being an emergency data network identifier may be determined by the source AMF entity based on emergency data network identifiers (such as Emergency DNNs as described previously) contained in emergency configuration data with which the source AMF is configured, or based on a request type "Emergency PDU Session" from the UE for establishing the PDU session.

Then, the determination unit 903 may determine that the PDU session is established for an emergency service based on the emergency indication.

In an exemplary embodiment, the target AMF 900 may further include a storage unit 905.

The storage unit 905 may store the emergency indication. The stored emergency indication may be carried in SessionContextList of the UE Context IE for the subsequent transmission.

Figure 10:
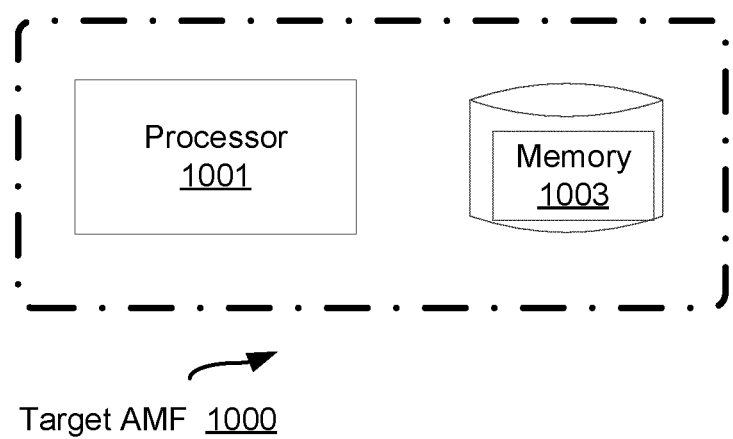
FIG. 10 schematically shows a block diagram of a target AMF according to another exemplary embodiment of the present disclosure.

Hereinafter, a structure of a target AMF according to another exemplary embodiment of the present disclosure will be described with reference to FIG. 10. FIG. 10 schematically shows a block diagram of a target AMF 1000 according to another exemplary embodiment of the present disclosure. The target AMF 1000 in FIG. 10 may perform the method 400 as described previously with reference to FIG. 4. Accordingly, some detailed description on the target AMF 1000 may refer to the corresponding description of the method 400 in FIG. 4 and the signaling sequence diagram of FIG. 6 as previously discussed, and thus will be omitted here for simplicity.

FIG. 10

As shown in FIG. 10, the target AMF 1000 includes at least one processor 1001 and at least one memory 1003. The at least one processor 1001 includes e.g., any suitable CPU (Central Processing Unit), microcontroller, DSP (Digital Signal Processor), etc., capable of executing computer program instructions. The at least one memory 1003 may be any combination of a RAM (Random Access Memory) and a ROM (Read Only Memory). The at least one processor memory 1003 may also include persistent storage, which, for example, can be any single one or combination of magnetic memory, optical memory, or solid state memory or even remotely mounted memory.

The at least one memory 1003 stores instructions executable by the at least one processor 1001, whereby the target AMF 1000 is operative to perform the actions, e.g., of the procedures as described earlier respectively in conjunction with FIG. 4.

In particular, the instructions, when loaded from the at least one memory 1003 and executed on the at least one processor 1001, may cause the target AMF 1000 to receive a mobility message (such as an Namf_Communication_UEContextTransfer Response message for Mobility Registration, an Namf_Communication_CreateUEContext Request message for Handover) from the source AMF. The mobility message carries an emergency indication indicating that a data network identifier (such as a DNN) for a PDU session is an emergency one, e.g., in SessionContextList of a UE Context IE.

The data network identifier for the PDU session being an emergency data network identifier may be determined by the source AMF entity based on emergency data network identifiers (such as Emergency DNNs as described previously) contained in emergency configuration data with which the source AMF is configured, or based on a request type "Emergency PDU Session" from the UE for establishing the PDU session.

The instructions, when loaded from the at least one memory 1003 and executed on the at least one processor 1001, may further cause the target AMF 1000 to determine that the PDU session is established for an emergency service based on the emergency indication.

In an exemplary embodiment, the instructions, when loaded from the at least one memory 1003 and executed on the at least one processor 1001, may further cause the target AMF 1000 to store the emergency indication. The stored emergency indication may be carried in SessionContextList of the UE Context IE for the subsequent transmission.

Figure 11:
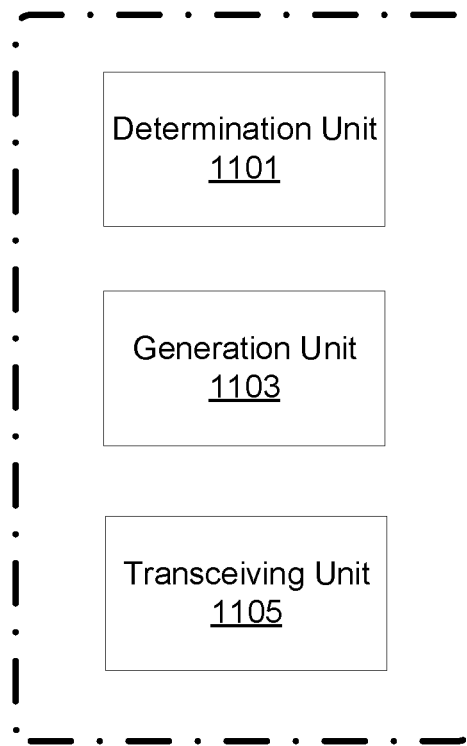
FIG. 11 schematically shows a block diagram of a source AMF according to an exemplary embodiment of the present disclosure.

Hereinafter, a structure of a source AMF according to an exemplary embodiment of the present disclosure will be described with reference to FIG. 11. FIG. 11 schematically shows a block diagram of a source AMF 1100 according to an exemplary embodiment of the present disclosure. The source AMF 1100 in FIG. 11 may perform the method 500 as described previously with reference to FIG. 5. Accordingly, some detailed description on the source AMF 1100 may refer to the corresponding description of the method 500 in FIG. 5 and the signaling sequence diagram of FIG. 6 as previously discussed, and thus will be omitted here for simplicity.

FIG. 11

As shown in FIG. 11, the source AMF 1100 includes a determination unit 1101, a generation unit 1103, and a transceiving unit 1105. It should be understood that the source AMF 1100 is used in the inter-AMF change procedure.

The determination unit 1101 may determine that a data network identifier (such as a DNN) for a PDU session to be transferred to the target AMF is an emergency data network identifier.

In particular, the source AMF may determine that the data network identifier (such as the DNN) for the PDU session is an emergency data network identifier based on emergency data network identifiers contained in emergency configuration data with which the source AMF entity is configured, or based on a request type "Emergency PDU Session" from the UE for establishing the PDU session.

In a particular example, the source AMF may determine whether the DNN for the PDU session is an emergency one based on Emergency DNNs that have been contained in the Emergency Configuration Data with which the source AMF is configured.

For example, the source AMF may compare the DNN for the PDU session with the Emergency DNNs that have been contained in the Emergency Configuration Data with which the source AMF is configured. If the DNN for the PDU session matches with one of the Emergency DNNs, the source AMF determines that the DNN for the PDU session is an emergency one.

The generation unit 1103 may generate an emergency indication indicating that the data network identifier is an emergency data network identifier.

The transceiving unit 1105 may transmit a mobility message carrying the emergency indication to a target AMF. The mobility message may be an Namf_Communication_UEContextTransfer Response message (for Mobility Registration) and/or an Namf_Communication_CreateUEContext Request message (for Handover). In particular, the source AMF may carry the emergency indication by the Namf_Communication_UEContextTransfer Response message and/or the Namf_Communication_CreateUEContext Request message in SessionContextList of a UE Context IE.

Figure 12:
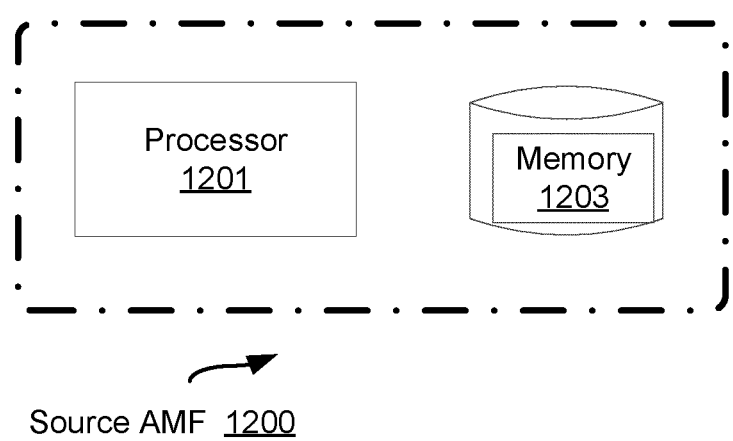
FIG. 12 schematically shows a block diagram of a source AMF according to another exemplary embodiment of the present disclosure.

Hereinafter, a structure of a source AMF according to another exemplary embodiment of the present disclosure will be described with reference to FIG. 12. FIG. 12 schematically shows a block diagram of a source AMF 1200 according to another exemplary embodiment of the present disclosure. The source AMF 1200 in FIG. 12 may perform the method 500 as described previously with reference to FIG. 5. Accordingly, some detailed description on the source AMF 1200 may refer to the corresponding description of the method 500 in FIG. 5 and the signaling sequence diagram of FIG. 6 as previously discussed, and thus will be omitted here for simplicity.

FIG. 12

As shown in FIG. 12, the source AMF 1200 includes at least one processor 1201 and at least one memory 1203. The at least one processor 1201 includes e.g., any suitable CPU (Central Processing Unit), microcontroller, DSP (Digital Signal Processor), etc., capable of executing computer program instructions. The at least one memory 1203 may be any combination of a RAM (Random Access Memory) and a ROM (Read Only Memory). The at least one processor memory 1203 may also include persistent storage, which, for example, can be any single one or combination of magnetic memory, optical memory, or solid state memory or even remotely mounted memory.

The at least one memory 1203 stores instructions executable by the at least one processor 1201, whereby the source AMF 1200 is operative to perform the actions, e.g., of the procedures as described earlier respectively in conjunction with FIG. 5.

In particular, the instructions, when loaded from the at least one memory 1203 and executed on the at least one processor 1201, may cause the source AMF 1200 to determine that a data network identifier (such as a DNN) for a PDU session to be transferred to the target AMF is an emergency data network identifier.

In particular, the source AMF may determine that the data network identifier (such as the DNN) for the PDU session is an emergency data network identifier based on emergency data network identifiers contained in emergency configuration data with which the source AMF entity is configured, or based on a request type "Emergency PDU Session" from the UE for establishing the PDU session.

In a particular example, the source AMF may determine whether the DNN for the PDU session is an emergency one based on Emergency DNNs that have been contained in the Emergency Configuration Data with which the source AMF is configured.

For example, the source AMF may compare the DNN for the PDU session with the Emergency DNNs that have been contained in the Emergency Configuration Data with which the source AMF is configured. If the DNN for the PDU session matches with one of the Emergency DNNs, the source AMF determines that the DNN for the PDU session is an emergency one.

The instructions, when loaded from the at least one memory 1203 and executed on the at least one processor 1201, may further cause the source AMF 1200 to generate an emergency indication indicating that the data network identifier is an emergency data network identifier.

The instructions, when loaded from the at least one memory 1203 and executed on the at least one processor 1201, may further cause the source AMF 1200 to transmit a mobility message carrying the emergency indication to a target AMF. The mobility message may be an Namf_Communication_UEContextTransfer Response message (for Mobility Registration) and/or an Namf_Communication_CreateUEContext Request message (for Handover). In particular, the source AMF may carry the emergency indication by the Namf_Communication_UEContextTransfer and/or the Response message Namf_Communication_CreateUEContext Request message in SessionContextList of a UE Context IE.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 801 causes the target mobility management node 800 to perform the actions, e.g., of the procedure described earlier in conjunction with FIG. 1; or code/computer readable instructions, which when executed by the at least one processor 1001 causes the target AMF 1000 to perform the actions, e.g., of the procedures described earlier respectively in conjunction with FIG. 4; or code/computer readable instructions, which when executed by the at least one processor 1701 causes the source AMF 1200 to perform the actions, e.g., of the procedures described earlier respectively in conjunction with FIG. 12.

The computer program product may be configured as a computer program code structured in computer program modules. The computer program modules could essentially perform the actions of the flow illustrated in any of FIGS. 1 to 6.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Some Embodiments

Some embodiments described above may be summarized in the following manner:

1. A method (100) at a first entity for managing access and mobility, comprising:
    receiving (S101) a mobility message from a second entity for managing access and mobility, wherein the mobility message carries a data network identifier for an IP connectivity;
    determining (S103) that the data network identifier in the received mobility message is an emergency data network identifier, based on emergency data network identifiers contained in emergency configuration data with which the first entity for managing access and mobility is configured; and
    determining (S105) that the IP connectivity is established for an emergency service.

2. The method (100) according to embodiment 1, further comprising:
    generating (S107) an emergency indication indicating that the data network identifier in the received mobility message is an emergency data network identifier; and
    storing (S109) the emergency indication.

3. The method (100) according to embodiment 2, wherein the stored emergency indication is carried in SessionContextList of a User Equipment 'UE' Context Information Element 'IE' for a subsequent transmission.

4. The method (100) according to any of embodiment 1 to 3, wherein
    the first entity for managing access and mobility is an Access Management Function 'AMF' entity, and the second entity for managing access and mobility is a Mobility Management Entity 'MME', and
    the IP connectivity is a Packet Data Network 'PDN' connection/Protocol Data Unit 'PDU' session.

5. The method (100) according to embodiment 4, wherein
    the mobility message comprises at least one of: a Forward Relocation Request message, or a Context Response message, and
    the data network identifier is an Access Point Name 'APN' carried by the Forward Relocation Request message and/or the Context Response message in an Evolved Packet System 'EPS' PDN Connection IE.

6. The method (100) according to any of embodiment 1 to 3, wherein
    the first entity for managing access and mobility is a first AMF entity, and the second entity for managing access and mobility is a second AMF entity, and
    the IP connectivity is a PDU session.

7. The method (100) according to embodiment 6, wherein
    the mobility message comprises at least one of: an Namf_Communication_UEContextTransfer Response message, or an Namf_Communication_CreateUEContext Request message, and
    the data network identifier is a DNN carried by the Namf_Communication_UEContextTransfer Response message and/or the Namf_Communication_CreateUEContext Request message in SessionContextList of a UE Context IE.

8. A method (400) at a first Access Management Function 'AMF' entity, comprising:
    receiving (S401) a mobility message from a second AMF entity, wherein the mobility message carries an emergency indication indicating that a data network identifier for a Protocol Data Unit 'PDU' session is an emergency data network identifier; and
    determining (S403) that the PDU session is established for an emergency service based on the emergency indication.

9. The method (400) according to embodiment 8, further comprising:
    storing (S405) the emergency indication.

10. The method (400) according to embodiment 9, wherein the stored emergency indication is carried in SessionContextList of a User Equipment 'UE' Context Information Element 'IE' for a subsequent transmission.

11. The method (400) according to any of embodiment 8 to 10, wherein the data network identifier for the PDU session being an emergency data network identifier is determined by the second AMF entity based on emergency data network identifiers contained in emergency configuration data with which the second AMF entity is configured, or based on a request type "Emergency PDU Session" from a UE for establishing the PDU session.

12. The method (400) according to any of embodiment 8 to 11, wherein
    the mobility message comprises at least one of: an Namf_Communication_UEContextTransfer Response message, or an Namf_Communication_CreateUEContext Request message, and
    the emergency indication is carried by the Namf_Communication_UEContextTransfer Response message and/or the Namf_Communication_CreateUEContext Request message in SessionContextList of a UE Context IE.

13. A method (500) at a second Access Management Function 'AMF' entity, comprising:
    determining (S501) that a data network identifier for a Protocol Data Unit 'PDU' session to be transferred to a first AMF is an emergency data network identifier;
    generating (S503) an emergency indication indicating that the data network identifier is an emergency data network identifier; and
    transmitting (S505) a mobility message carrying the emergency indication to the first AMF entity.

14. The method (500) according to embodiment 13, wherein the data network identifier for the PDU session is determined to be an emergency data network identifier based on emergency data network identifiers contained in emergency configuration data with which the second AMF entity is configured, or based on a request type "Emergency PDU Session" from a UE for establishing the PDU session.

15. The method (500) according to embodiment 13 or 14, wherein
the mobility message comprises at least one of: an Namf_Communication_UEContextTransfer Response message, or an Namf_Communication_CreateUEContext Request message, and
the emergency indication is carried by the Namf_Communication_UEContextTransfer Response message and/or the Namf_Communication_CreateUEContext Request message in SessionContextList of a User Equipment 'UE' Context Information Element 'IE'.

16. A first entity (800) for managing access and mobility, comprising:
at least one processor (801), and
at least one memory (803), storing instructions which, when executed on the at least one processor (801), cause the first entity (800) for managing access and mobility to:
receive a mobility message from a second entity for managing access and mobility, wherein the mobility message carries a data network identifier for an IP connectivity;
determine that the data network identifier in the received mobility message is an emergency data network identifier, based on emergency data network identifiers contained in emergency configuration data with which the first entity for managing access and mobility is configured; and
determine that the IP connectivity is established for an emergency service.

17. The entity (800) for managing access and mobility according to embodiment 16, wherein the instructions, when executed on the at least one processor (801), further cause the entity (800) for managing access and mobility to perform the method according to any of embodiment 2 to 7.

18. A first Access Management Function 'AMF' entity (1000), comprising:
at least one processor (1001), and
at least one memory (1003), storing instructions which, when executed on the at least one processor (1001), cause the first AMF entity (1000) to:
receive a mobility message from a second AMF entity, wherein the mobility message carries an emergency indication indicating that a data network identifier for a Protocol Data Unit 'PDU' session is an emergency data network identifier; and
determine that the PDU session is established for an emergency service based on the emergency indication.

19. The first AMF entity (1000) according to embodiment 18, wherein the instructions, when executed on the at least one processor (1001), further cause the first AMF entity (1000) to perform the method according to any of embodiment 9 to 12.

20. A second Access Management Function 'AMF' entity (1200), comprising:
at least one processor (1201), and
at least one memory (1203), storing instructions which, when executed on the at least one processor (1201), cause the second AMF entity (1200) to:
determine that a data network identifier for a Protocol Data Unit 'PDU' session to be transferred to a first AMF is an emergency data network identifier;
generate an emergency indication indicating that the data network identifier is an emergency data network identifier; and
transmit a mobility message carrying the emergency indication to the first AMF entity.

21. The second AMF entity (1200) according to embodiment 20, wherein the instructions, when executed on the at least one processor (1201), further cause the second AMF entity (1200) to perform the method according to any of embodiment 14 to 15.

22. A computer readable storage medium having computer program instructions stored thereon, the computer program instructions, when executed by at least one processor in an entity for managing access and mobility, causing the entity for managing access and mobility to perform the method according to any of claims 1 to 15

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:
1. A method at a first access and mobility management entity for managing access and mobility for at least a first user equipment (UE), the method comprising:
the first access and mobility management entity (AMME) for managing access and mobility for at least the first UE receiving a mobility message transmitted by a second AMME for managing access and mobility for at least the first UE, wherein the mobility message transmitted by the second AMME comprises a data network identifier for a Protocol Data Unit (PDU) session established for the first UE;
based on one or more emergency data network identifiers contained in emergency configuration data with which the first AMME is configured, determining that the data network identifier included in the received mobility message is an emergency data network identifier; and
determining that the PDU session was established for the first UE for an emergency service.

2. The method of claim 1, further comprising:
generating an emergency indication indicating that the data network identifier in the received mobility message is an emergency data network identifier; and
storing the emergency indication.

3. The method of claim 2, wherein the stored emergency indication is carried in SessionContextList of a UE Context Information Element (IE) for a subsequent transmission.

4. The method of claim 1, wherein
the first AMME is an Access Management Function (AMF), and the second AMME is a Mobility Management Entity (MME), and
the PDU session is a Packet Data Network (PDN) connection/Protocol Data Unit (PDU) session.

5. The method of claim 4, wherein
the mobility message comprises at least one of: a Forward Relocation Request message or a Context Response message, and
the data network identifier is an Access Point Name (APN) carried by the Forward Relocation Request message and/or the Context Response message in an Evolved Packet System (EPS) PDN Connection IE.

6. The method of claim 1, wherein
the first AMME is a first AMF, and
the second AMME is a second AMF.

7. The method of claim 6, wherein
the mobility message comprises at least one of: an Namf_Communication_UEContextTransfer Response message, or an Namf_Communication_CreateUEContext Request message, and
the data network identifier is a DNN carried by the Namf_Communication_UEContextTransfer Response message and/or the Namf_Communication_CreateUEContext Request message in SessionContextList of a UE Context IE.

8. A non-transitory computer readable storage medium storing computer program instructions thereon, the computer program instructions, when executed by at least one processor in an entity for managing access and mobility, causing the entity for managing access and mobility to perform the method of claim 1.

9. A method at a first Access Management Function (AMF) for managing access and mobility for at least a first user equipment (UE), comprising:
the first AMF receiving a mobility message transmitted by a second AMF for managing access and mobility for at least the first UE, wherein the mobility message transmitted by the second AMF comprises an emergency indication indicating that a data network identifier for a Protocol Data Unit (PDU) session established for the first UE is an emergency data network identifier; and
the first AMF determining, based on the emergency indication, that the PDU session established for the first UE is established for an emergency service.

10. The method of claim 9, further comprising storing the emergency indication.

11. The method of claim 10, wherein the stored emergency indication is carried in SessionContextList of a UE Context Information Element (IE) for a subsequent transmission.

12. The method of claim 9, wherein the data network identifier for the PDU session being an emergency data network identifier is determined by the second AMF based on emergency data network identifiers contained in emergency configuration data with which the second AMF is configured, or based on a request type "Emergency PDU Session" from the first UE for establishing the PDU session.

13. The method of claim 9, wherein
the mobility message comprises at least one of: an Namf_Communication_UEContextTransfer Response message, or an or an Namf_Communication_CreateUEContext Request message, and
the emergency indication is carried by the Namf_Communication_UEContextTransfer Response message and/or the Namf_Communication_CreateUEContext Request message in SessionContextList of a UE Context IE.

14. A method at a source Access Management Function (AMF), comprising:
the source AMF determining that a data network identifier for a user equipment's (UE's) Protocol Data Unit (PDU) session to be transferred to a target AMF is an emergency data network identifier;
as a result of determining that the data network identifier for the UE's PDU session to be transferred to the target AMF is an emergency data network identifier, the source AMF generating a mobility message comprising an emergency indication indicating that the data network identifier is an emergency data network identifier; and
the source AMF transmitting to the target AMF the generated mobility message comprising the emergency indication indicating that the data network identifier for the UE's PDU session to be transferred to the target AMF is an emergency data network identifier, wherein the mobility message comprises at least one of:
an Namf_Communication_UEContextTransfer Response message, or
an Namf_Communication_CreateUEContext Request message, and
the emergency indication is carried by the Namf_Communication_UEContextTransfer Response message and/or the Namf_Communication_CreateUEContext Request message in SessionContextList of a UE Context Information Element (IE).

15. The method of claim 14, wherein the data network identifier for the PDU session is determined to be an emergency data network identifier based on emergency data network identifiers contained in emergency configuration data with which the second AMF is configured, or based on a request type "Emergency PDU Session" from the UE for establishing the PDU session.

16. A first access and mobility management entity (AMME) for managing access and mobility for at least a first user equipment (UE), the first AMME comprising:
a receiver for receiving a mobility message transmitted by a second AMME for managing access and mobility for at least the first UE, wherein the mobility message transmitted by the second AMME comprises a data network identifier for a Protocol Data Unit (PDU) session established for the first UE;
processing circuitry, and
memory storing instructions which for configuring the first AMME to perform a method comprising:
based on one or more emergency data network identifiers contained in emergency configuration data with which the first AMME is configured, determining that the data network identifier included in the received mobility message is an emergency data network identifier; and
determining that the PDU session was established for the first UE for an emergency service.

17. The first AMME of claim 16, wherein the method further comprises:
generating an emergency indication indicating that the data network identifier in the received mobility message is an emergency data network identifier; and
storing the emergency indication.

18. A first Access Management Function (AMF) for managing access and mobility for at least a first user equipment (UE), comprising:
a receiver for receiving a mobility message transmitted by a second AMF for managing access and mobility for at least the first UE, wherein the mobility message transmitted by the second AMF comprises an emergency indication indicating that a data network identifier for a Protocol Data Unit (PDU) session established for the first UE is an emergency data network identifier;
processing circuitry, and
memory storing instructions for configuring the first AMF to perform a method comprising:
determining, based on the emergency indication, that the PDU session established for the first UE is established for an emergency service.

19. The first AMF of claim 18, wherein the method further comprises storing the emergency indication, wherein the stored emergency indication is carried in SessionContextList of a UE Context Information Element (IE) for a subsequent transmission.

20. A source Access Management Function (AMF), comprising:
processing circuitry, and
memory storing instructions for configuring the source AMF to perform a method comprising:
determining that a data network identifier for a user equipment's (UE's) Protocol Data Unit (PDU) session to be transferred to a target AMF is an emergency data network identifier;
as a result of determining that the data network identifier for the UE's PDU session to be transferred to the target AMF is an emergency data network identifier, generating a mobility message comprising an emergency indication indicating that the data network identifier is an emergency data network identifier; and
transmitting to the target AMF the generated mobility message comprising the emergency indication indicating that the data network identifier for the UE's PDU session to be transferred to the target AMF is an emergency data network identifier, wherein
the mobility message comprises at least one of:
an Namf_Communication_UEContextTransfer Response message, or
an Namf_Communication_CreateUEContext Request message, and
the emergency indication is carried by the Namf_Communication_UEContextTransfer Response message and/or the Namf_Communication_CreateUEContext Request message in SessionContextList of a UE Context Information Element (IE).

21. The source AMF of claim 20, wherein the source AMF determines that the data network identifier is an emergency data network identifier based on: i) emergency data network identifiers contained in emergency configuration data with which the second AMF is configured or ii) a request type "Emergency PDU Session" from the UE for establishing the PDU session.

* * * * *